(12) United States Patent
Gottschalk et al.

(10) Patent No.: US 8,393,638 B2
(45) Date of Patent: Mar. 12, 2013

(54) KNEE AIRBAG

(75) Inventors: Konrad Gottschalk, Freising (DE); Michael Wolanski, Wroclaw (PL); Lukasz Przybysz, Wroclaw (PL); Jacek Wozniczek, Wroclaw (PL)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/133,677

(22) PCT Filed: Nov. 7, 2009

(86) PCT No.: PCT/EP2009/007978
§ 371 (c)(1),
(2), (4) Date: Jul. 1, 2011

(87) PCT Pub. No.: WO2010/066323
PCT Pub. Date: Jun. 17, 2010

(65) Prior Publication Data
US 2011/0260434 A1  Oct. 27, 2011

(30) Foreign Application Priority Data
Dec. 9, 2008  (DE) .......................... 10 2008 060 858

(51) Int. Cl.
B60R 21/206 (2011.01)
B60R 21/2338 (2011.01)

(52) U.S. Cl. ................... 280/730.1; 280/743.2; 280/752

(58) Field of Classification Search .................. 280/729, 280/730.1, 743.2, 752, 753
See application file for complete search history.

(56) References Cited

U.S. PATENT DOCUMENTS

| 4,300,894 | A | 11/1981 | Cumming et al. |
| 5,647,609 | A | 7/1997 | Spencer et al. |
| 6,916,039 | B2 * | 7/2005 | Abe ............................... 280/729 |
| 7,207,594 | B2 * | 4/2007 | Igawa et al. ................. 280/730.1 |
| 8,042,831 | B2 * | 10/2011 | Hoffman et al. ........... 280/730.1 |
| 2005/0151351 | A1 | 7/2005 | Enders et al. |
| 2009/0058052 | A1 * | 3/2009 | Ford et al. .................. 280/730.1 |

FOREIGN PATENT DOCUMENTS

| DE | 102006051218 A1 | 11/2007 |
| DE | 102007005304 A1 | 8/2008 |
| EP | 0773144 A1 | 5/1997 |
| EP | 1300299 A1 | 4/2003 |
| GB | 2263448 A * | 7/1993 |
| WO | WO 2008092595 A1 * | 8/2008 |

OTHER PUBLICATIONS

"Oblong" definition in American English Dictionary—Cambridge Dictionary Online, available at, http://dictionary.cambridge.org/dictionary/american-english/oblong?q=oblong (last visited on Aug. 16, 2012).*
"Opening" definition in American English Dictionary—Cambridge Dictionary Online, available at, http://dictionary.cambridge.org/dictionary/american-english/opening_3 (last visited on Aug. 17, 2012).*

* cited by examiner

*Primary Examiner* — Joseph Rocca
(74) *Attorney, Agent, or Firm* — Brinks Hofer Gilson & Lione

(57) ABSTRACT

A knee airbag for a motor vehicle is described. This knee airbag extends in its installed state along a longitudinal direction (X) from a rear end to a front end. The airbag skin (5) of the knee airbag exhibits a front section (20) and a rear section (22) and a connecting line for contouring of the airbag is located on the rear section (22). In order to simplify the assembly of the knee airbag, the connecting line mainly extends transverse to the longitudinal direction (X) and shortens the rear section (22) in longitudinal direction.

7 Claims, 3 Drawing Sheets

KNEE AIRBAG

CROSS REFERENCE TO RELATED APPLICATIONS

This application claims priority to PCT Patent Application PCT/EP2008/007978 filed Nov. 7, 2009, and German Patent Application 10 2008 060 858.0 filed Dec. 9, 2008.

TECHNICAL FIELD OF THE INVENTION

The invention relates to a knee airbag for a motor vehicle which in an installed state extends along a longitudinal direction from a rear end to a front end.

BACKGROUND OF THE INVENTION

Knee airbags are becoming increasingly widespread in the automotive industry and have two basic tasks: on the one hand they should prevent the knee-shin-areas of the vehicle occupant to be protected from coming into direct contact with the lower area of the instrument panel in case of an accident. Furthermore, knee airbags should prevent the pelvic area of the occupants from being displaced forwards; this is particularly important in the case of occupants who are not wearing seat belts.

The knee airbag is arranged in a housing which is located in the lower area of the instrument panel. It is often desired to locate this housing as far as possible in the direction of the footwell, therefore in the front area of the instrument panel which faces away from the occupant, or in the transition area between the instrument panel and the footwell. However, as the instrument panel is domed in a convex fashion, the knee airbag also has to follow this domed shape, thus showing a "banana shaped" cross-section. In principal this can be achieved through the attachment of outer tethers, which is, however, often not desired.

Generic patent application DE 10 2007 005 304 A1 therefore suggests providing a longitudinal fold and several further folds arranged within this longitudinal fold in a rear section of the airbag skin, in other words in the section which is turned towards the instrument panel, whereby the further folds are secured by means of seams. These further folds achieve a shortening of the ridge of the first fold. When the rear section is under tensile stress—which is the case when the airbag is filled—it assumes a concave shape because of the shortening, leading to assumption of the desired "banana shape". A knee airbag manufactured in this way basically functions well. However, a disadvantage is that several folds have to be provided which are positioned relatively precisely in relation to each other, which on the one hand makes it difficult to automate manufacture, and on the other hand generally requires a precise final inspection.

SUMMARY OF THE INVENTION

Starting from this basis, the present invention sets itself the problem of improving a knee airbag of the generic type in such a way that it can be manufactured in a more rational way.

This task is fulfilled by means of a knee airbag having a rear section of the airbag skin that exhibits a connecting line for contouring of the airbag. The airbag skin is connected with itself along this connecting line, so that a fold is created. The connecting line basically extends transverse to the longitudinal direction of the knee airbag, whereby by longitudinal direction a direction is meant which, when the airbag is in installed and expanded state lies in a vertically standing longitudinal vehicle plane. In other words, the connecting line extends basically perpendicular to the longitudinal direction of the vehicle when in installed and expanded state.

As a rule, one single such connecting line is sufficient, which is located in the vicinity of the fixing points of the knee airbag.

In a preferred embodiment, the rear section of the airbag skin exhibits an oblong-shaped opening, which is closed by the connecting line. This has two advantages: on the one hand it is prevented that the inflated airbag is pushed away from the internal structure by the material of the fold, which would counteract the desired effect and in the worst case would compensate it partially. On the other hand, this measure makes it easily possible to provide a tether which connects the rear with the front section of the knee airbag precisely at the position of the connecting line.

In most applications it will be preferable to form the connecting line as a seam, but it is also possible to implement the connecting line in the form of a weld seam or bonded connection.

Further preferred embodiments result from the embodiment described below with reference to the figures.

DETAILED DESCRIPTION OF PREFERRED EMBODIMENTS

Figure 1:
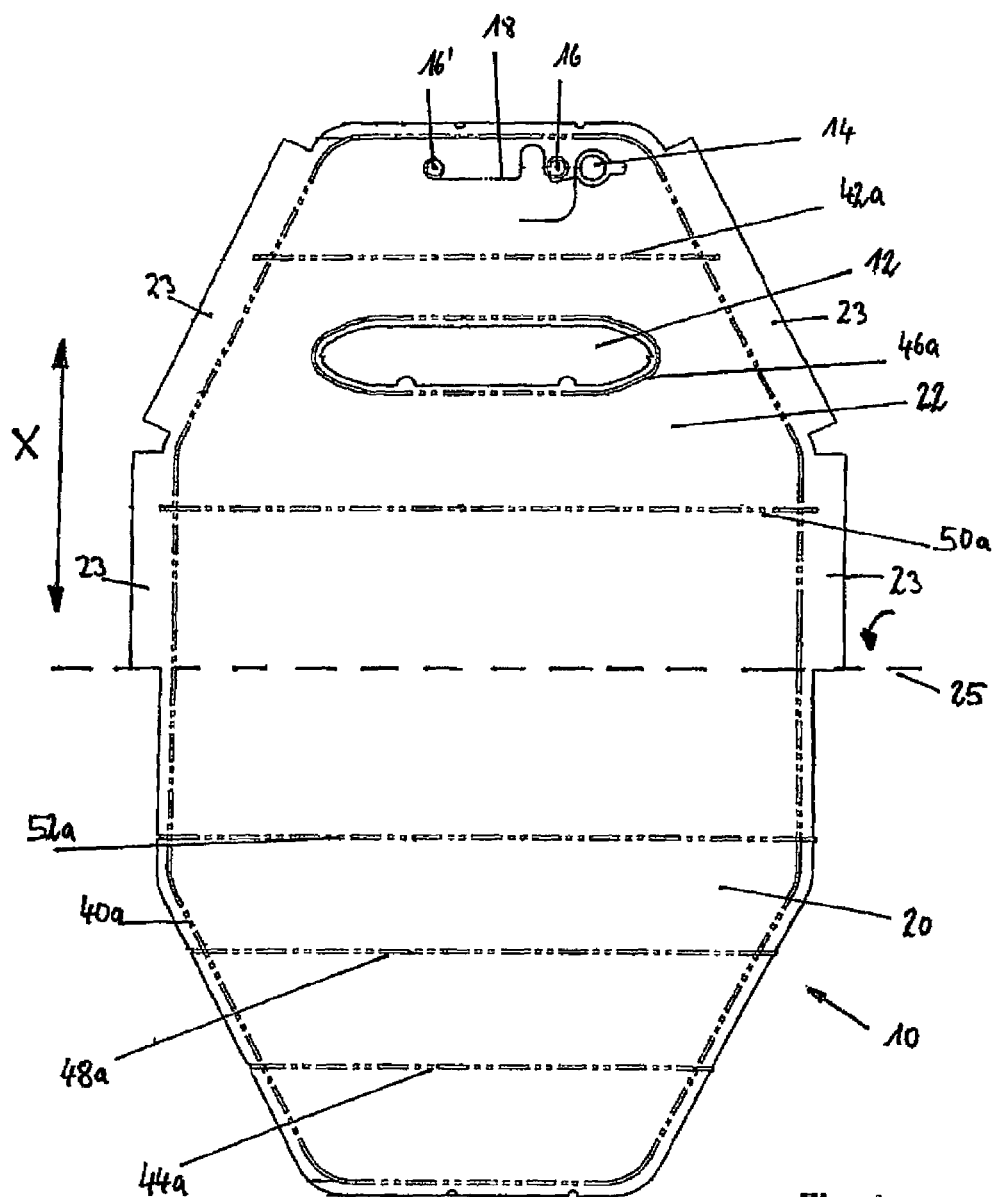
FIG. 1 shows a pre-cut piece for an airbag skin in unsewn condition.
Figure 2:
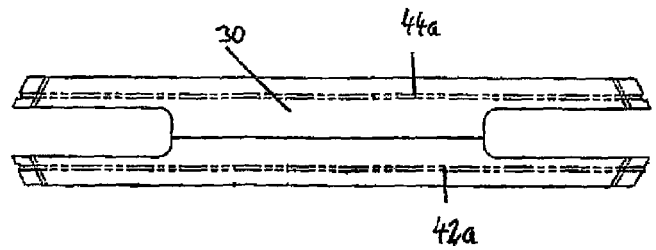
FIG. 2 shows a first tether to be sewn to the pre-cut piece of FIG. 1.
Figure 3:
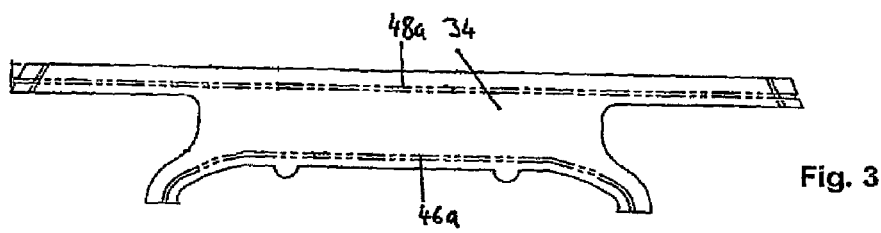
FIG. 3 shows a second tether to be sewn to the pre-cut piece of FIG. 1.
Figure 4:
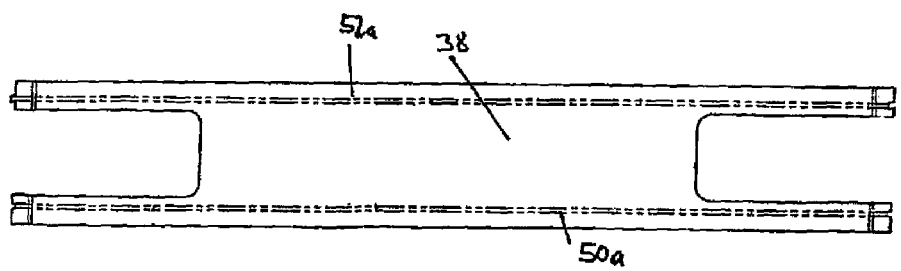
FIG. 4 shows a third tether to be sewn to the pre-cut piece of FIG. 1.

FIG. 1 shows a pre-cut piece for a knee airbag, FIGS. 2, 3 and 4 each show a tether 30, 34, 38, which are sewn together with pre-cut piece 10 from FIG. 1 to form a knee airbag. The positions of the seams are indicated in FIGS. 1 to 4 and designated with the reference numbers 40a, 42a, 44a, 46a, 48a, 50a and 52a.

Pre-cut piece 10 basically exhibits mirror symmetry in relation to fold line 25, around which pre-cut piece 10 is folded during manufacture of the knee airbag. Fold line 25 separates and divides rear section 22 from front section 20. An edge seam is located along the edge of pre-cut piece 10; the position of the edge seam is designated with reference number 40a. Following closing of the edge seam, front section 20 and rear section 22 are joined directly with one another along their edges, whereby the edges are formed by the edge seam 40b and the fold line 25. When front section 20 and rear section 22 are joined together by means of the edge seam, the areas enclosed by the edge seam first lie on top of one another congruently (with exception of the hole 12) and flat.

There are the following deviations from the mirror symmetry of front section 20 and rear section 22: rear section 22 exhibits side ears 23, which are bent over and sewn with the edge seam 40b when the airbag is sewn together, so that they protect the edge seam at the side. Furthermore, rear section 22 exhibits an ignition connector opening 14 at its rearmost end, two bolt holes 16, 16' and a cut 18. A gas generator can be inserted through this cut 18 and can be connected with the interior structure of the vehicle by means of bolts which extend through bolt holes 16, 16'. An ignition cable is connected to the gas generator through ignition connector opening 14.

Finally, rear section 22 exhibits an opening 12 which is formed in an oblong shape, and whose long axis stands parallel to fold line 25, in other words perpendicular to the longitudinal direction X of the pre-cut piece. The position 46a of the shortening seam extends around the opening 12. The shortening seam is at the same time the third tether seam.

The knee airbag is manufactured of the components described above as follows: as a first step tethers 30, 34, 38 are sewn along positions 52a, 48a and 44a with the front section 30 of pre-cut piece 10. After this, the pre-cut piece 10 is folded along fold line 25 and initially the third tether 38 is sewn along position 50a and then the first tether 30 is sewn along position 42a with rear section 22. At this state of manufacture, front and rear sections 20,22 lie flat and congruently on top of one another, so that edge seam 40b is very easy to create. Following creation of edge seam 40b, finally opening 12 is closed by means of the shortening seam and third tether seam 46b, whereby the corresponding end area of second tether 46a is held between the edges of opening 12.

First and third tether 30, 38 are double T-shaped with side cutouts through which gas can flow. The side facing the rear section 22 of the second tether 34 is concave and follows the curvature of the oblong opening 12.

Figure 5:
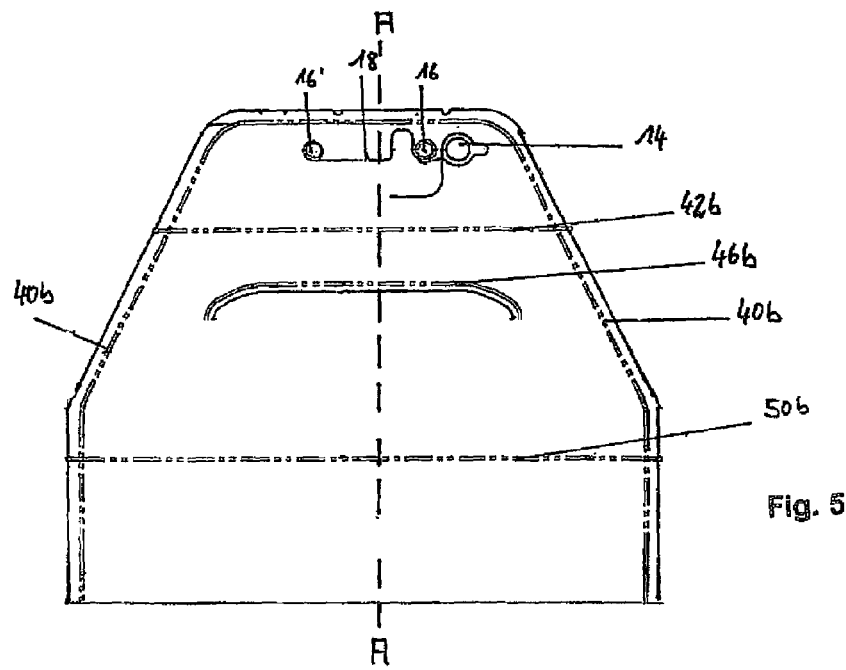
FIG. 5 shows the finished sewn knee airbag in a view corresponding to FIG. 1.

FIG. 5 shows the finished sewn knee airbag. Edge seam 40b can be seen, along with first tether seam 42b, the shortening seam and the third tether seam 46b and the fifth tether seam 50b.

Figure 6:
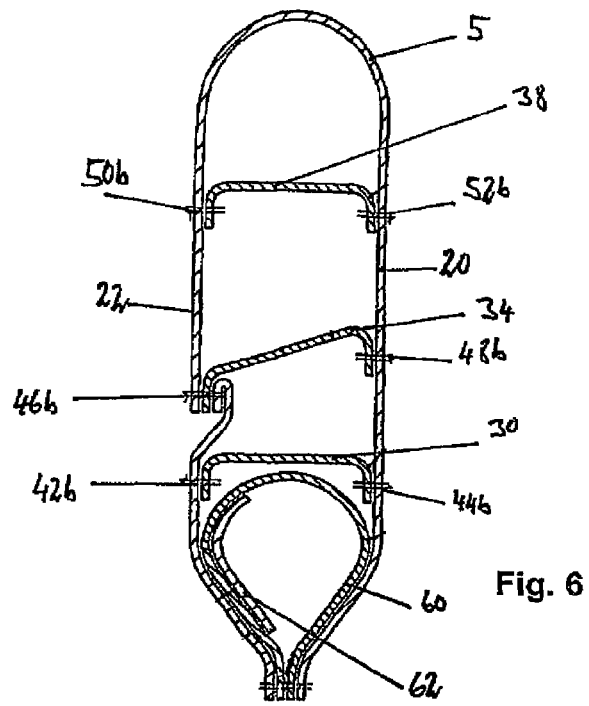
FIG. 6 shows a schematic view of a section along section line A-A of FIG. 5.

FIG. 6 is a schematic section along Plane A-A through FIG. 5. In this view, it can be seen particularly clearly how tethers 30, 34, 38 are sewn to the airbag skin 5 by means of tether seams 42b, 44b, 46b, 48b, 50b, 52b. In particular it can be seen how the rear end of second tether 34 is held between the edges of opening 12 by means of the shortening third tether seam 46b. FIG. 6 also shows a gas guide element 60 with additional reinforcement layer 62, which can be additionally provided. Gas guide element 60 and reinforcement layer 62 are not shown in the other figures.

Figure 7:
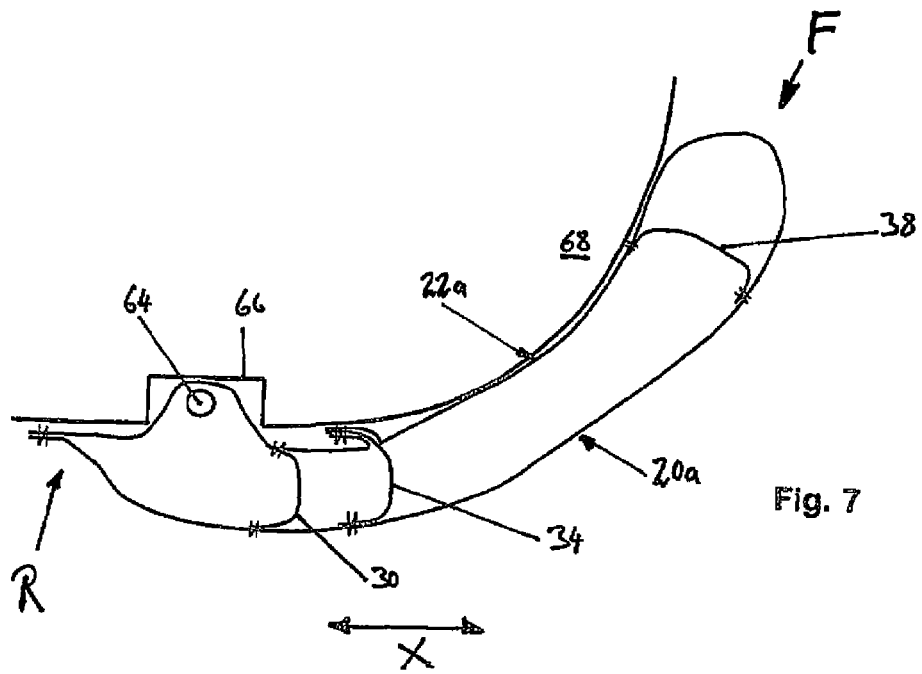
FIG. 7 shows the knee airbag mounted in a vehicle and inflated in a view mainly corresponding to the section shown in FIG. 6.

FIG. 7 shows the installed situation when the knee airbag is fully inflated. The knee airbag extends from a rear end R to a front end F basically in the direction X. Here the effect can be seen which is caused by shortening seam 46b. Because of this shortening third tether seam 46b, rear section 22 is shortened in X direction in comparison with the front section 20, which causes the airbag filled with gas to bend away at this location, and therefore comes to rest against a lower area 68 of the instrument panel with its support surface 22a, which is part of rear section 22, and follows this lower area of the instrument panel, so that a banana-shaped cross-section results. The impact surface 20a lies opposite support surface 22a.

Alternatively to the embodiment shown, the airbag skin can be assembled of two pre-cut pieces, whereby one pre-cut piece forms the front section and the other pre-cut piece forms the rear section and a completely surrounding edge seam is provided.

The invention is not limited to the illustrated embodiment, but rather includes all means functioning identically within the meaning of the invention. The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A knee airbag for a motor vehicle, which in an installed state extends along a longitudinal direction (X) from a rear end to a front end, comprising:
    an airbag skin (5), with a front section (20) and a rear section (22), the front section and the rear section having longitudinal edges of substantially equal lengths,
    an oblong opening in a continuous portion of the airbag skin in the rear section, and
    a connecting line closing the oblong opening and contouring the airbag, the connecting line mainly extending transverse to the longitudinal direction (X) and shortening the rear section (22) in the longitudinal direction.

2. The knee airbag according to claim 1, having exactly one connecting line.

3. The knee airbag according to claim 1, wherein the front section and the rear section (20, 22) are connected directly with one another along an edge area.

4. The knee airbag according to claim 1, wherein the connecting line is a seam (46b).

5. The knee airbag according to claim 1, wherein the airbag skin (5) is assembled from two pre-cut pieces.

6. The knee airbag according to claim 1, wherein the airbag skin is folded from one pre-cut piece (10).

7. A knee airbag for a motor vehicle, which in an installed state extends along a longitudinal direction (X) from a rear end to a front end, comprising:
    an airbag skin (5), with a front section (20) and a rear section (22),
    an oblong opening in a continuous portion of the airbag skin in the rear section,
    a connecting line closing the oblong opening and contouring the airbag, the connecting line mainly extending transverse to the longitudinal direction (X) and shortening the rear section (22) in the longitudinal direction, and
an internal tether (34) with a rear end connected with the rear section (22) at the connecting line and with a front end connected with the front section (20).

\* \* \* \* \*

UNITED STATES PATENT AND TRADEMARK OFFICE
CERTIFICATE OF CORRECTION

PATENT NO.       : 8,393,638 B2
APPLICATION NO.  : 13/133677
DATED            : March 12, 2013
INVENTOR(S)      : Gottschalk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 12 days.

Signed and Sealed this
First Day of September, 2015

Michelle K. Lee
*Director of the United States Patent and Trademark Office*